(12) United States Patent
Imagawa et al.

(10) Patent No.: US 12,331,778 B2
(45) Date of Patent: Jun. 17, 2025

(54) CABLE COUPLING MECHANISM

(71) Applicant: HI-LEX CORPORATION, Hyogo (JP)

(72) Inventors: Takuma Imagawa, Hyogo (JP); Shuhei Mieda, Hyogo (JP); Atsushi Nishimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/575,130

(22) PCT Filed: Mar. 31, 2022

(86) PCT No.: PCT/JP2022/016432
§ 371 (c)(1),
(2) Date: Dec. 28, 2023

(87) PCT Pub. No.: WO2023/281885
PCT Pub. Date: Jan. 12, 2023

(65) Prior Publication Data
US 2024/0301913 A1      Sep. 12, 2024

(30) Foreign Application Priority Data
Jul. 6, 2021   (JP) .................................. 2021-112174

(51) Int. Cl.
*F16C 1/14*          (2006.01)
(52) U.S. Cl.
CPC ..................................... *F16C 1/14* (2013.01)
(58) Field of Classification Search
CPC .. F16C 1/14; F16C 1/101; F16C 1/106; B60T 11/06
See application file for complete search history.

(56) References Cited

U.S. PATENT DOCUMENTS 1,674,751 A * 6/1928 Von Luettwitz .......... B62L 3/02
188/26
5,829,314 A * 11/1998 Scura ..................... B62M 25/04
188/24.11
(Continued)

FOREIGN PATENT DOCUMENTS

JP          S58149880 A       9/1983
JP          H0495469 U        8/1992

OTHER PUBLICATIONS

International Search Report from corresponding PCT Application No. PCT/JP2022/016432, Jun. 14, 2022.
(Continued)

*Primary Examiner* — Thomas C Diaz
(74) *Attorney, Agent, or Firm* — Workman Nydegger

(57) ABSTRACT

A cable coupling mechanism comprises an operating cable, a first operated cable, a second operated cable, and a coupling device, wherein the coupling device has a housing and a slider, wherein the housing has one pair of guide surfaces, wherein the slider is configured to be rotatable around an axis perpendicular to a sliding direction and a width direction, and wherein both side edges in the width direction of the slider have curved surfaces to be convex toward each of the one pair of guide surfaces such that movement of the slider in the sliding direction is not hindered when the slider rotates around the axis. According to this cable coupling mechanism, it is possible to easily operate the two operated cables so as to synchronize the two operated cables.

2 Claims, 7 Drawing Sheets

(56) References Cited

U.S. PATENT DOCUMENTS 6,817,451 B1 * 11/2004 Chen .................. B62B 9/085
                                                                           188/29
2016/0347344 A1 * 12/2016 Strauss ............... B60T 11/06

OTHER PUBLICATIONS

Japanese Office Action from corresponding JP Application No. 2021-112174, Jun. 4, 2024.

* cited by examiner

CABLE COUPLING MECHANISM

TECHNICAL FIELD

The present invention relates to a cable coupling mechanism.

BACKGROUND ART

An operating mechanism to operate operation targets respectively operated by each of two operated cables by transmitting the operating force on one operating cable to the two operated cables is known. As one example of such an operating mechanism, for example, a hood unlocking mechanism to open a hood (a bonnet and the like) of a vehicle is known (see Patent Document 1, for example).

Such an unlocking mechanism comprises an operating lever, a cable coupling mechanism to couple the one operating cable and the two operated cables, and two locking members connected to the two operated cables. The cable coupling mechanism has the one operating cable, the two operated cables, and a coupling device. The coupling device has a housing, and a slider to slide in the housing. The operating cable and the two operated cables are connected to the slider. By operating the operating lever so that the operating cable is pull-operated, the slider to which the operating cable is connected slides in one direction in the housing. When the slider slides in one direction, two operated cables are pull-operated in one direction by the slider. In this way, the locking members connected to the two operated cables are operated in the direction to unlock the hood, allowing opening of the hood.

PRIOR ART DOCUMENT

Patent Document

Patent Document 1: JPH04-95469U

SUMMARY OF THE INVENTION

Problem to be Solved by the Invention

However, in a case that the operating lever is on the driver's compartment, the lengths of each of the two operated cables from the coupling device to the operation targets (the locking members and the like) can be different from each other. Alternatively, even in a case that the two operated cables have the same length, the two operated cables can be routed along mutually different routing paths (with different number of times of curving or different curvature of curving), or variations in manufacturing the operating cable or operated cable or variations in the mounting position of the operation target can occur. In this way, when the routing lengths or routing conditions of the two operated cables differ from each other, it is difficult to operate the two operated cables so as to synchronize the two operated cables.

Then, an object of the present invention is to provide a cable coupling mechanism that makes it possible to easily operate the two operated cables so as to synchronize the two operated cables.

Means to Solve the Problem

A cable coupling mechanism of the present invention comprises an operating cable directly or indirectly connected to an operating portion: a first operated cable being operated by an operating force of the operating cable: a second operated cable being operated by the operating force of the operating cable; and a coupling device coupling the operating cable to the first operated cable and the second operated cable, wherein the coupling device has a housing, and a slider to slide in the housing: wherein the housing has one pair of guide surfaces extending along a sliding direction of the slider and opposing with each other in a width direction perpendicular to the sliding direction: wherein the slider has an operating cable coupling portion, to which one end of the operating cable is coupled such that the operating cable extends to one side in the sliding direction: a first operated cable coupling portion, to which one end of the first operated cable is coupled such that the first operated cable extends to an other side in the sliding direction; and a second operated cable coupling portion, to which one end of the second operated cable is coupled such that the second operated cable extends to the other side in the sliding direction: wherein the first operated cable coupling portion is provided on one side in the width direction with respect to the operating cable coupling portion, the second operated cable coupling portion is provided on an other side in the width direction with respect to the operating cable coupling portion: wherein the slider is configured to be rotatable around an axis perpendicular to the sliding direction and the width direction; and wherein both side edges in the width direction of the slider have curved surfaces to be convex toward each of the one pair of guide surfaces such that movement of the slider in the sliding direction is not hindered when the slider rotates around the axis.

Effects of the Invention

The cable coupling mechanism of the present invention makes it possible to easily operate the two operated cables so as to synchronize the two operated cables.

EMBODIMENT FOR CARRYING OUT THE INVENTION

Below, a cable coupling mechanism of one embodiment of the present invention will be described with reference to the drawings. Besides, in the present specification, the expression "perpendicular to A" and that similar thereto refers to not only a direction being completely perpendicular to A, but refers to include being substantially perpendicular to A. Moreover, in the present specification, the expression "parallel to B" and that similar thereto refers to not only a direction being completely parallel to B, but refers to include being substantially parallel to B. Furthermore, in the present specification, the expression "a C-letter shape" and that similar thereto refers to not only a complete C-letter shape, but refers to include a shape suggesting a C-letter shape in appearance (a substantially C-letter shape).

Figure 1:
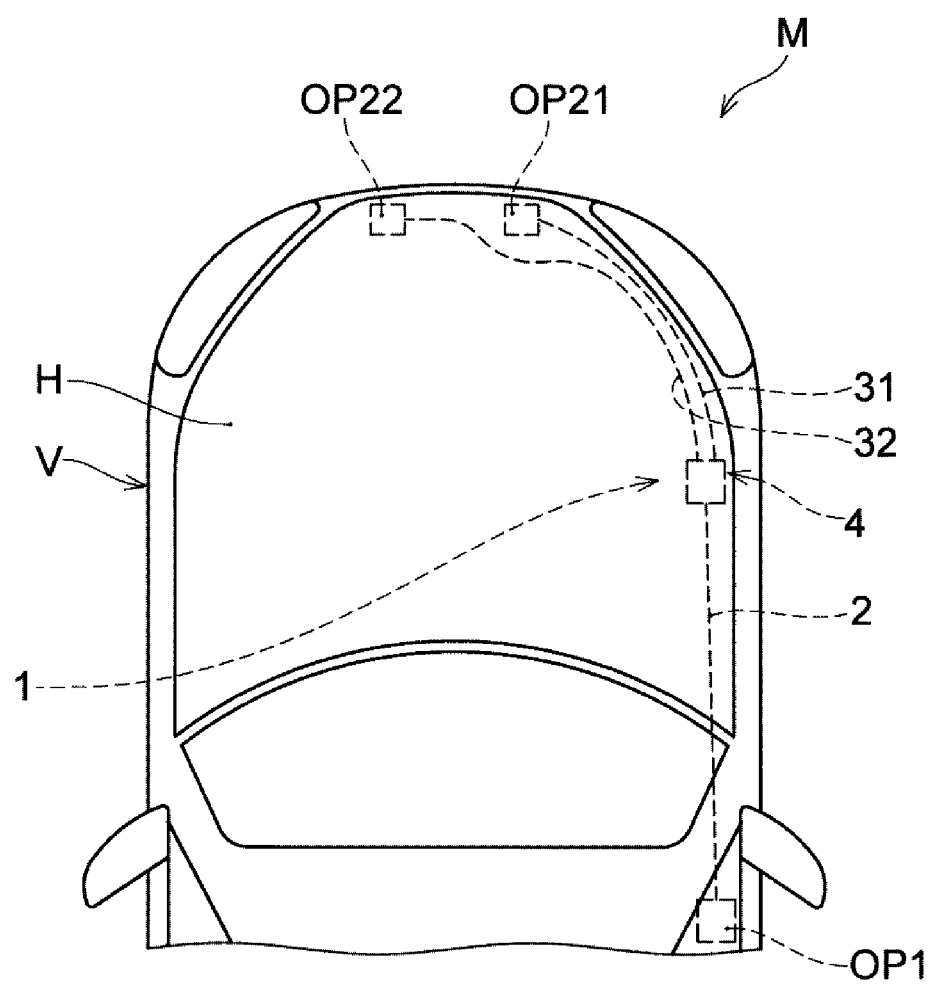
FIG. 1 is a schematic view showing a vehicle in which a cable coupling mechanism of one embodiment of the present invention is provided.

As shown in FIG. 1, a cable coupling mechanism 1 of the present embodiment comprises an operating cable 2 directly or indirectly connected to an operating portion OP1, a first operated cable 31 being operated by an operating force of the operating cable 2, a second operated cable 32 being operated by the operating force of the operating cable 2, and a coupling device 4 coupling the operating cable 2 to the first operated cable 31 and the second operated cable 32. While details are described below, as shown in FIG. 2, the coupling device 4 has a housing 41, and a slider 42 to slide in the housing 41.

In a predetermined mounting object, the cable coupling mechanism 1 couples the one operating cable 2 to two operated cables (the first operated cable 31 and the second operated cable 32 in the present embodiment: below, the first operated cable 31 and the second operated cable 32 will collectively be referred to as the operated cables 31, 32). The cable coupling mechanism 1 is configured to couple the operating cable 2 to the first operated cable 31 and the second operated cable 32 such that both of the first operated cable 31 and the second operated cable 32 are operated by the operating force of the operating cable 2.

Figure 2:
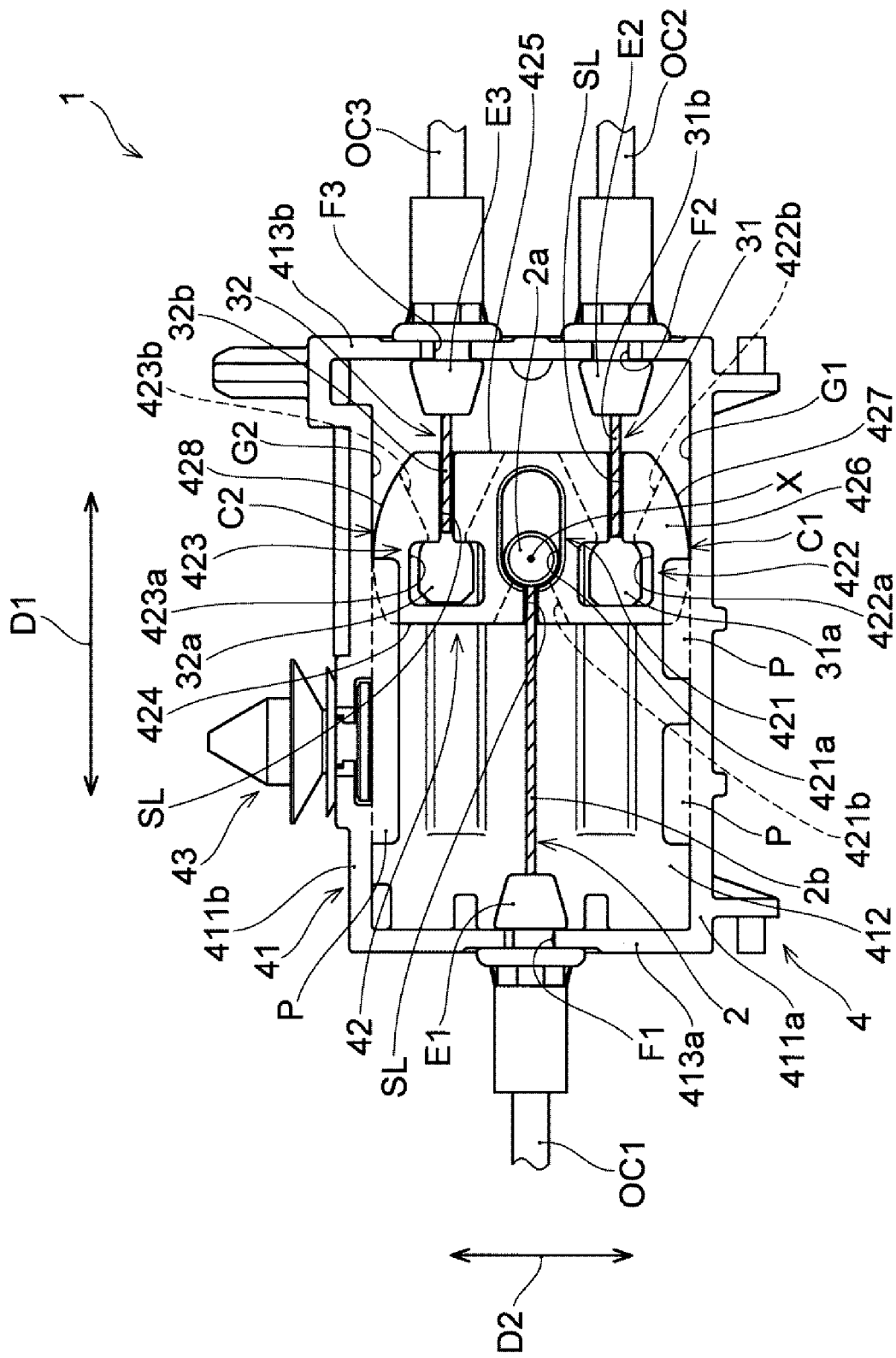
FIG. 2 is a view showing the state of a slider before an operating cable is operated in the cable coupling mechanism of one embodiment of the present invention.

In the present embodiment, as shown in FIGS. 1 and 2, the cable coupling mechanism 1 is configured to couple the single operating cable 2 to the two operated cables (the first operated cable 31 and the second operated cable 32). However, the cable coupling mechanism 1 can be provided with two or more of the operating cables or with three or more of the operated cables.

The application of the cable coupling mechanism 1 is not limited as long as it is the application in which the first operated cable 31 and the second operated cable 32 are configured to be operated by the operating force of the one operating cable 2. In the present embodiment, as described below, the cable coupling mechanism 1 is applied to a cable operating mechanism in which the first operated cable 31 and the second operated cable 32 are routed with different lengths with each other and/or in different paths with each other in a predetermined mounting object.

More specifically, as shown in FIG. 1, the cable coupling mechanism 1 is applied to a cable operating mechanism M in which two operated portions OP21, OP22 are operated by an operation of the operating portion OP1. In the present embodiment, the cable operating mechanism M comprises the cable coupling mechanism 1, the operating portion OP1 being operable to operate the operating cable 2, the first operated portion OP21 operated by the first operated cable 31, and the second operated portion OP22 operated by the second operated cable 32. More specifically, the cable operating mechanism M is an unlocking mechanism to unlock a hood H of a vehicle V being a mounting object and is configured such that two locking members (the first operated portion OP21 and the second operated portion OP22) are unlocked by operating a hood opener (the operating portion OP1) provided on the driver's compartment of the vehicle V. When the operating portion OP1 is operated and the operating cable 2 is operated, the first operated cable 31 and the second operated cable 32 are operated. When the first operated cable 31 and the second operated cable 32 are operated, the first operated portion OP21 and the second operated portion OP22 are operated simultaneously and the hood H can be opened. It should be noted that the cable coupling mechanism can be applied to another unlocking mechanism such as a seat reclining mechanism having two locking members, or another cable operating mechanism, for example. Moreover, while the mounting object of the cable coupling mechanism 1 is the vehicle V in the present embodiment, it can be a structure other than the vehicle.

As shown in FIG. 1, the operating cable 2 is connected to the operating portion OP1 and the coupling device 4. The operating cable 2 is pull-operated in one direction by the operating portion OP1 being operated. As described below, the operating force applied to the operating cable 2 is transmitted to the first operated cable 31 and the second operated cable 32 via the slider 42.

While the operating cable 2 is directly connected to the operating portion OP1 in the present embodiment, it can be indirectly connected to the operating portion OP1 via another member such as a transmission member and the like. It should be noted that the operating portion OP1 can be a manual operation portion such as a lever and the like, or can be an operating portion that is driven by an electrical means such as a motor to electrically operate the operating cable 2.

A one end 2a of the operating cable 2 is connected to the coupling device 4 (see FIG. 2). Specifically, the one end 2a of the operating cable 2 is connected to the slider 42 of the coupling device 4. The other end of the operating cable 2 is connected to the operating portion OP1 side.

The structure of the operating cable 2 is not limited as long as the operating force of the operating cable 2 is configured to be transmitted to the first operated cable 31 and the second operated cable 32 via the slider 42. The operating cable 2 can be an inner cable of a known control cable, for example. In the present embodiment, as shown in FIG. 2, the operating cable 2 has a cable end provided at the one end 2a of the operating cable 2 (below also called the cable end 2a), a cable end provided at the other end of the operating cable 2, and a cable body 2b.

In the present embodiment, as shown in FIG. 2, the operating cable 2 is housed in an outer casing OC1 and is routed in a predetermined routing path from the operating portion OP1 to the coupling device 4 by the outer casing OC1 in a mounting object (the vehicle V in the present embodiment). One end of the outer casing OC1 is mounted to the housing 41 of the coupling device 4, while the other end thereof is mounted to the operating portion OP1 side.

The shape of the one end (the cable end) 2a of the operating cable 2 is not limited as long as the operating force of the operating cable 2 is configured to be transmitted to the first operated cable 31 and the second operated cable 32 via the slider 42. In the present embodiment, the one end (the cable end) 2a of the operating cable 2 has a shape that allows relative rotation thereof with respect to the slider 42 when the slider 42 rotates around a predetermined axis (an axis X) as described below. The shape that allows relative rotation can be any shape that does not hinder rotation of the one end 2a of the operating cable 2 relative to the slider 42 in a direction around the axis X. For example, the shape may be a spherical shape, a circular columnar shape, a polygonal columnar shape, and the like with a central axis extending in a thickness direction D3 described below (see FIG. 5). Moreover, the one end 2a of the operating cable 2 can be one in which a curved surface or polygonal-shaped portion that allows relative rotation of the one end 2a of the operating cable 2 with respect to the slider 42 in a direction around the axis X is formed only in a part of the outer periphery. It should be noted that in a case that a below-described operating cable coupling portion 421 of the slider 42 has a shape that allows relative rotation of the one end 2*a* of the operating cable 2, the shape of the one end 2*a* of the operating cable 2 is not limited. The one end 2*a* of the operating cable 2 refers to an end region in the length direction of the operating cable 2 and does not refer to only the tip end of the operating cable 2. Therefore, for example, a cable portion can further extend beyond the one end (the cable end) 2*a* of the operating cable 2. This is also the same for a one end 31*a* of the first operated cable 31 and a one end 32*a* of the second operated cable 32, described below.

Figure 3:
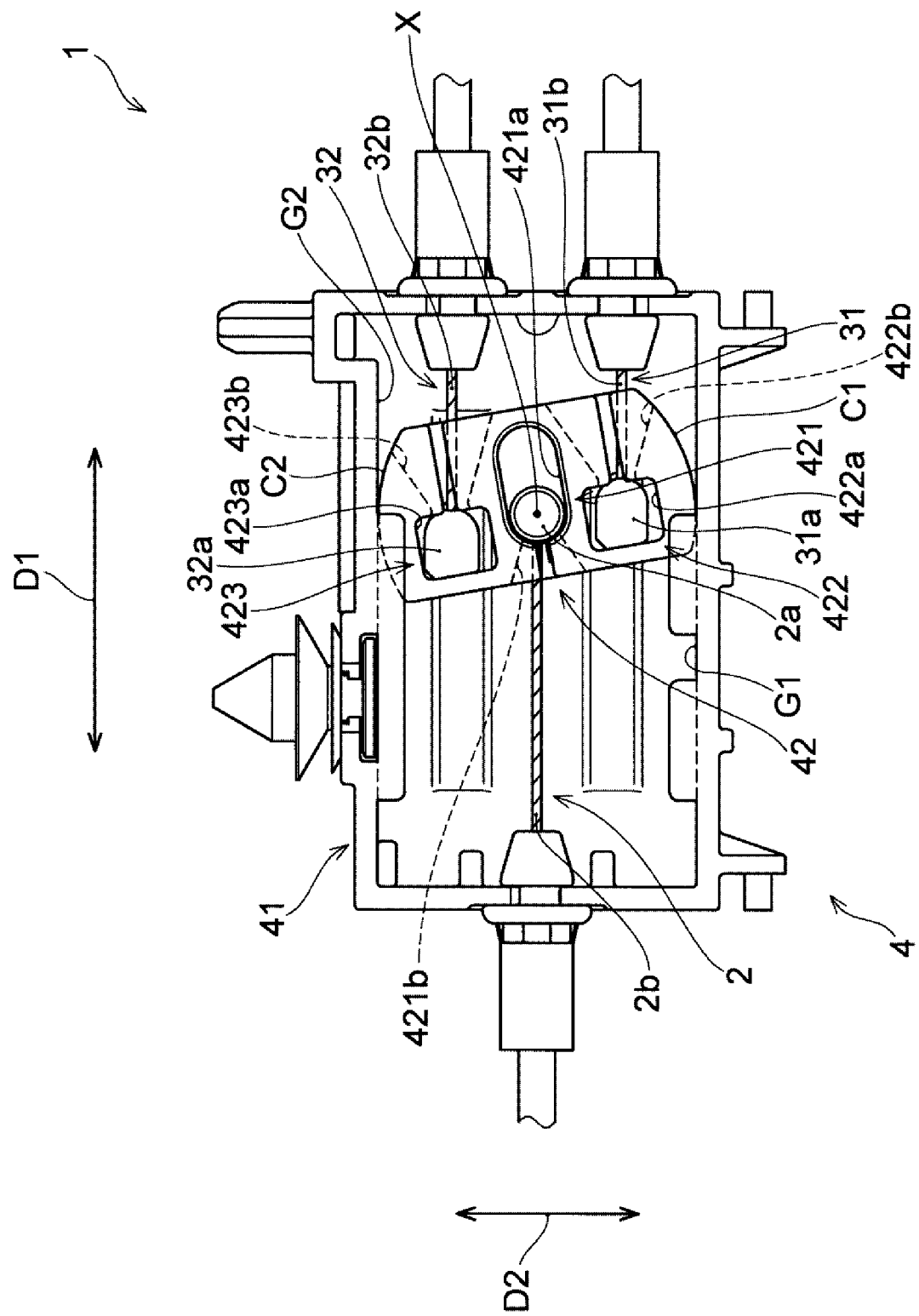
FIG. 3 is a view showing the state in which the slider rotates from the state shown in FIG. 2 by the operating cable being operated.
Figure 4:
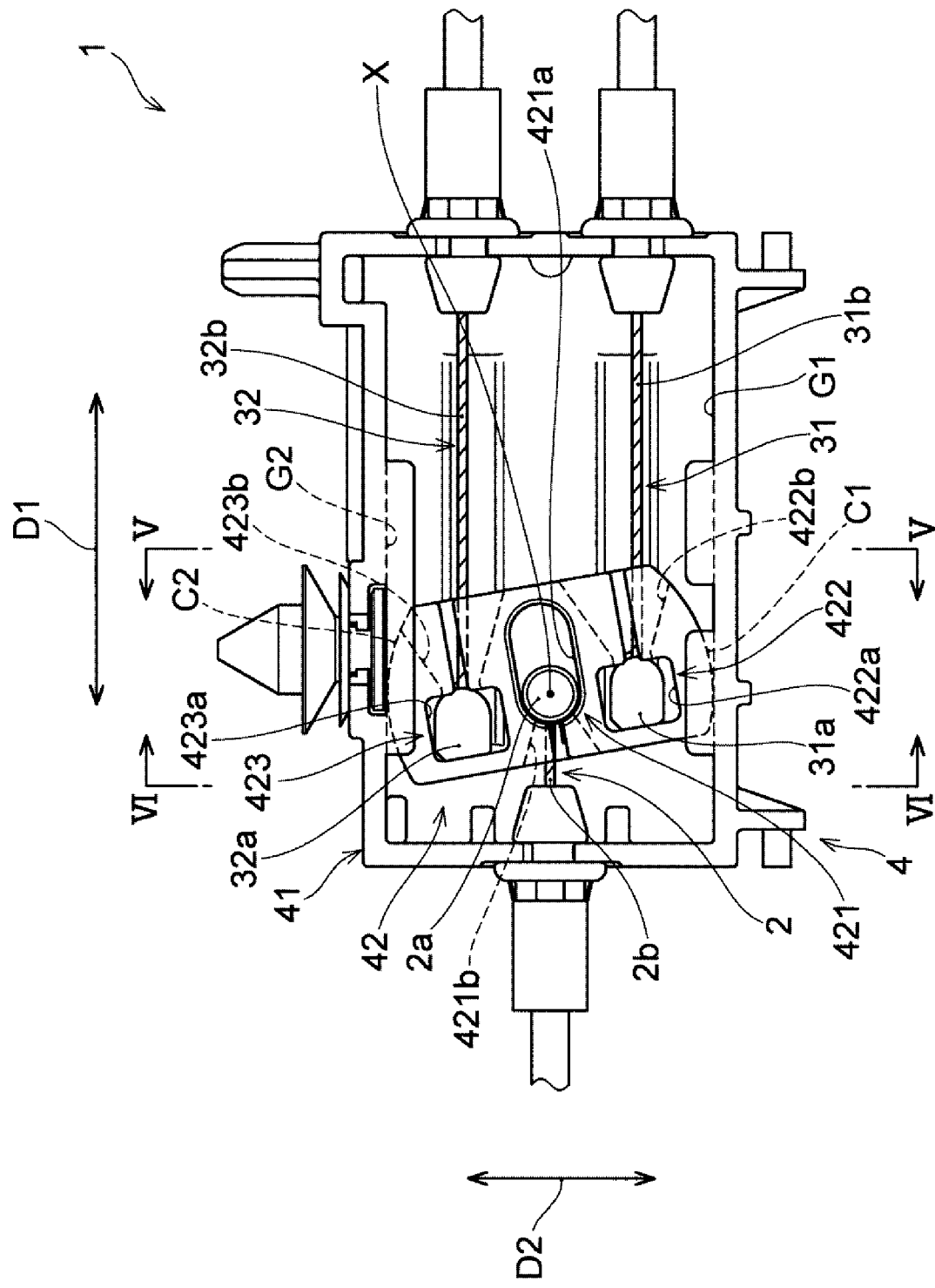
FIG. 4 is a view showing the state in which the slider moves in a sliding direction from the state shown in FIG. 3 by the operating cable being operated further.

The first operated cable 31 is a cable operated by the operating force of the operating cable 2. Specifically, as shown in FIGS. 2 to 4, when the operating cable 2 is pull-operated, the slider 42 moves to one side in a sliding direction D1 by the operating force of the operating cable 2. Accordingly, the first operated cable 31 is pull-operated to one side (to the left in FIGS. 2 to 4) in the sliding direction D1 by the slider 42. In this way, in the present embodiment, the first operated portion OP21 connected to the first operated cable 31 is operated.

In the present specification, the term "sliding direction D1" refers to a direction in which the slider 42 moves (left-right direction in FIG. 2). In the present embodiment, the sliding direction D1 is a direction being parallel to a direction in which the operating cable 2 extends in the housing 41. Moreover, the term "width direction D2" refers to one direction being perpendicular to the sliding direction D1 of the slider 42. In the present embodiment, the width direction D2 is a direction in which the one end 2*a* of the operating cable 2, the one end 31*a* of the first operated cable 31, and the one end 32*a* of the second operated cable 32 are arranged side by side. Moreover, the width direction D2 is a direction in which the first operated cable 31 and the second operated cable 32 are separated in the housing 41. Moreover, the term "thickness direction D3" is a direction being perpendicular to both the sliding direction D1 and the width direction D2.

In the present embodiment, as shown in FIG. 2, the one end 31*a* of the first operated cable 31 is connected to the coupling device 4. Specifically, the one end 31*a* of the first operated cable 31 is connected to the slider 42 of the coupling device 4. The other end (not shown) of the first operated cable 31 is connected to the first operated portion OP21 side.

The structure of the first operated cable 31 is not limited as long as the operating force of the operating cable 2 is configured to be allowed to be transmitted to the first operated cable 31 via the slider 42 so as to operate the operation target (the first operated portion OP21), which is connected to the first operated cable 31. The first operated cable 31 can be an inner cable of a known control cable, for example. In the present embodiment, as shown in FIG. 2, the first operated cable 31 has a cable end provided at the one end 31*a* of the first operated cable 31 (below also called the cable end 31*a*), a cable end provided at the other end of the first operated cable 31, and a cable body 31*b*.

In the present embodiment, as shown in FIG. 2, the first operated cable 31 is housed in an outer casing OC2 and is routed in a predetermined routing path from the coupling device 4 to the first operated portion OP21 by the outer casing OC2 in the mounting object (the vehicle V in the present embodiment). One end of the outer casing OC2 is mounted to the housing 41 of the coupling device 4, while the other end thereof is mounted to the first operated portion OP21 side.

The shape of the one end (the cable end) 31*a* of the first operated cable 31 is not limited as long as the operating force of the operating cable 2 is configured to be transmitted to the first operated cable 31 via the slider 42. In the present embodiment, the one end (the cable end) 31*a* of the first operated cable 31 has a shape that allows relative rotation thereof with respect to the slider 42 when the slider 42 rotates around a predetermined axis (an axis X) as described below. The shape that allows relative rotation can be any shape that does not hinder rotation of the one end 31*a* of the first operated cable 31 relative to the slider 42 in a direction around the axis X. For example, the shape may be a spherical shape, a circular columnar shape, a polygonal columnar shape, and the like with a central axis extending in the thickness direction D3. Moreover, the one end 31*a* of the first operated cable 31 can be one in which a curved surface or polygonal-shaped portion that allows relative rotation of the one end 31*a* of the first operated cable 31 with respect to the slider 42 in a direction around the axis X is formed only in a part of the outer periphery. It should be noted that in a case that a below-described first operated cable coupling portion 422 of the slider 42 has a shape that allows relative rotation of the one end 31*a* of the first operated cable 31, the shape of the one end 31*a* of the first operated cable 31 is not limited.

The second operated cable 32 is a cable operated by the operating force of the operating cable 2. Specifically, as shown in FIGS. 2 to 4, when the operating cable 2 is pull-operated, the slider 42 moves to one side in the sliding direction D1 by the operating force of the operating cable 2. Accordingly, the second operated cable 32 is pull-operated to one side in the sliding direction D1 by the slider 42. In this way, in the present embodiment, the second operated portion OP22 connected to the second operated cable 32 is operated.

In the present embodiment, as shown in FIG. 2, the one end 32*a* of the second operated cable 32 is connected to the coupling device 4. Specifically, the one end 32*a* of the second operated cable 32 is connected to the slider 42 of the coupling device 4. The other end (not shown) of the second operated cable 32 is connected to the second operated portion OP 22 side.

The structure of the second operated cable 32 is not limited as long as the operating force of the operating cable 2 is configured to be allowed to be transmitted to the second operated cable 32 via the slider 42 so as to operate the operation target (the second operated portion OP22), which is connected to the second operated cable 32. The second operated cable 32 can be an inner cable of a known control cable, for example. In the present embodiment, as shown in FIG. 2, the second operated cable 32 has a cable end provided at the one end 32*a* of the second operated cable 32 (below also called the cable end 32*a*), a cable end (not shown) provided at the other end of the second operated cable 32, and a cable body 32*b*.

In the present embodiment, as shown in FIG. 2, the second operated cable 32 is housed in an outer casing OC3 and is routed in a predetermined routing path from the coupling device 4 to the second operated portion OP22 by the outer casing OC3 in the mounting object (the vehicle V in the present embodiment). One end of the outer casing OC3 is mounted to the housing 41 of the coupling device 4, while the other end thereof is mounted to the second operated portion OP22 side. In the present embodiment, as shown in FIG. 1, the length of the second operated cable 32 differs from the length of the first operated cable 31 and the routing path of the second operated cable 32 differs from the routing path of the first operated cable 31. Specifically, the length of the second operated cable 32 is longer than the length of the first operated cable 31 and the second operated cable 32 is routed in a path different from the routing path of the first operated cable 31.

The shape of the one end (the cable end) 32a of the second operated cable 32 is not limited as long as the operating force of the operating cable 2 is configured to be transmitted to the second operated cable 32 via the slider 42. In the present embodiment, the one end (the cable end) 32a of the second operated cable 32 has a shape that allows rotation thereof with respect to the slider 42 when the slider 42 rotates around a predetermined axis (an axis X) as described below. The shape that allows relative rotation can be any shape that does not hinder rotation of the one end 32a of the second operated cable 32 relative to the slider 42 in a direction around the axis X. For example, the shape may be a spherical shape, a circular columnar shape, a polygonal columnar shape, and the like with a central axis extending in the thickness direction D3. Moreover, the one end 32a of the second operated cable 32 can be one in which a curved surface or polygonal-shaped portion that allows relative rotation of the one end 32a of the second operated cable 32 with respect to the slider 42 in a direction around the axis X is formed only in a part of the outer periphery. It should be noted that in a case that a below-described second operated cable coupling portion 423 of the slider 42 has a shape that allows relative rotation of the one end 32a of the second operated cable 32, the shape of the one end 32a of the second operated cable 32 is not limited.

As shown in FIG. 2, the coupling device 4 couples the operating cable 2 to the first operated cable 31 and the second operated cable 32 via the slider 42. The coupling device 4 couples the operating cable 2 to the first operated cable 31 and the second operated cable 32 via the slider 42 such that the operating force of the operating cable 2 is transmitted to the first operated cable 31 and the second operated cable 32. As shown in FIG. 2, the coupling device 4 has the housing 41, and the slider 42 sliding in the housing 41. In the present embodiment, the coupling device 4 comprises a fixing portion 43 to fix the housing 41 of the coupling device 4 to the mounting object. The fixing portion 43 is a portion being fixed to a portion to be fixed, which is provided to the mounting object (for example, a fitting hole provided to a vehicle body). The structure of the fixing portion 43 is not limited as long as the fixing portion 43 can fix the housing 41 of the coupling device 4 to the mounting object. The fixing portion 43 can be, for example, a fitting member to be press-fitted into a fitting hole and the like, a member to be screw-connected, such as a screw and bolt, or any other known fixing means.

The housing 41 houses the slider 42, and guides the slider 42 such that the slider 42 can move in the sliding direction D1. In the present embodiment, as shown in FIG. 2, the housing 41 has one pair of guide surfaces G1, G2 extending along the sliding direction D1 of the slider 42 and opposing with each other in the width direction D2 perpendicular to the sliding direction D1.

The guide surfaces G1, G2 guide the slider 42 such that the slider 42 can move in the sliding direction D1. As shown in FIG. 2, the guide surfaces G1, G2 abuttably oppose both side edges (side surfaces 427, 428 to be described below) of the slider 42 in the width direction D2. As shown in FIG. 2, the guide surfaces G1, G2 extend along the sliding direction D1 of the slider 42. More specifically, the guide surfaces G1, G2 are surfaces extending in the sliding direction D1 and the thickness direction D3, and extend parallel with each other such that the distance in the width direction D2 is constant even when the position in the sliding direction D1 changes.

The overall shape of the housing 41 is not limited as long as the housing 41 can house the slider 42 therein, and the housing 41 can guide the slider 42 such that the slider 42 can move in the sliding direction D1. In the present embodiment, the housing 41 is formed in a substantially rectangular box shape having an internal space in which the slider 42 can be housed. In the present embodiment, as shown in FIG. 2, the housing 41 comprises one pair of side walls 411a, 411b provided to separate from each other, a bottom wall 412 connecting the one pair of side walls 411a, 411b in the width direction D2, a top wall (not shown) opposing the bottom wall 412, and end walls 413a, 413b provided at both ends of the housing 41 in the sliding direction D1.

The one pair of side walls 411a, 411b are walls extending in the sliding direction D1 and the thickness direction D3. The one pair of side walls 411a, 411b are provided to oppose in the width direction D2 with each other. In the present embodiment, the guide surfaces G1, G2 are provided on the inner surfaces of the pair of side walls 411a, 411b, and the slider 42 is guided by the one pair of side walls 411a, 411b. In the present embodiment, the one pair of side walls 411a, 411b are provided parallel with each other. Moreover, the one pair of side walls 411, 411b extend perpendicular to the bottom wall 412 and the top wall and extend perpendicular to the one pair of end walls 413a, 413b.

Figure 5:
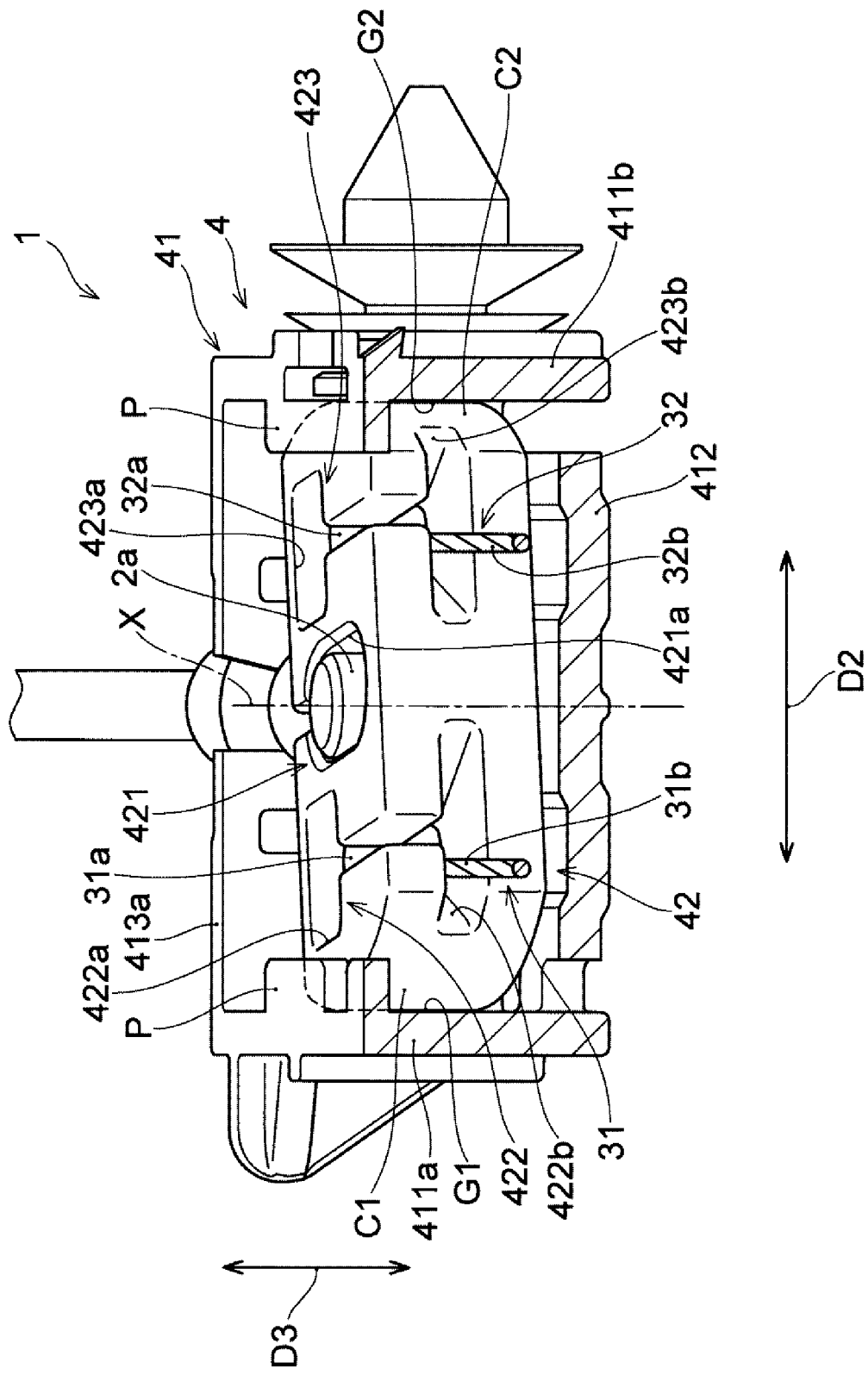
FIG. 5 is a perspective view in which a housing is cut along a line V-V in FIG. 4.
Figure 6:
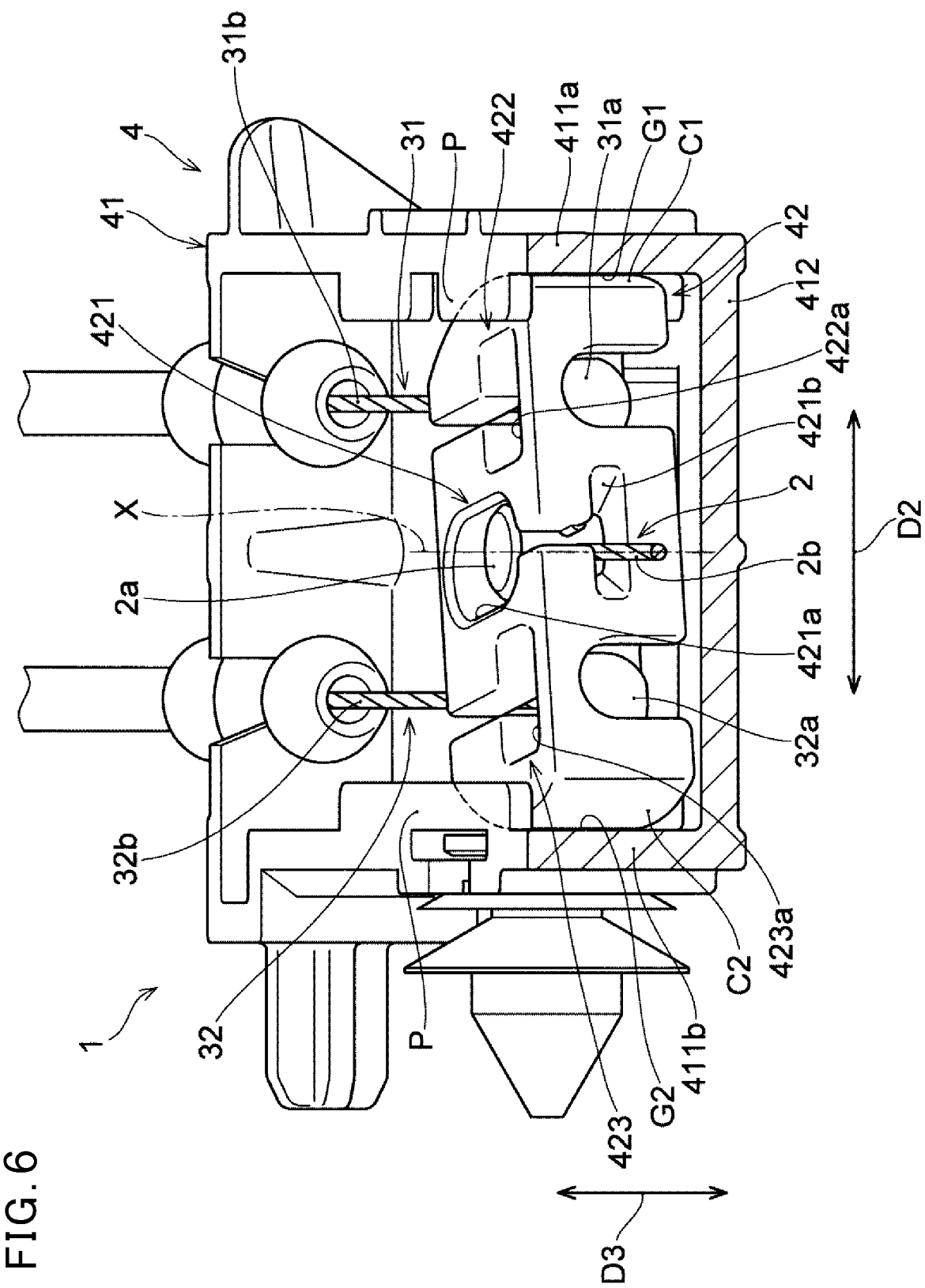
FIG. 6 is a perspective view in which the housing is cut along a line VI-VI in FIG. 4.

As shown in FIGS. 2, 5, and 6, at the end portions of the side walls 411a, 411b in the thickness direction D3 (the end portions on the side opposite to the bottom wall 412), detachment preventing portions P are provided along the sliding direction D1. The detachment preventing portions P protrude to the inner side with a predetermined width in the width direction D2. The detachment preventing portions P oppose, in the thickness direction D3, both of the end portions in the width direction D2 of the slider 42, thereby suppressing the slider 42 housed in the housing 41 being detached from the housing 41. In the present embodiment, the detachment preventing portion P is a plate-like piece provided at a part of the side walls 411a, 411b in the length direction (sliding direction D1). The plate-like piece extends in an elongated manner in the sliding direction D1. In the side walls 411a, 411b, a non-formed region in which the detachment preventing portion P is not provided (a right side region of the side walls 411a, 411b in FIG. 2) is configured to be longer than the length of the slider 42 in the sliding direction D1. In this case, the slider 42 can be easily housed in the housing 41 from the non-formed region in which the detachment preventing portion P is not provided. When the outer casings OC2 and OC3 are mounted on the end wall 413b after the slider 42 is housed in the housing 41, terminal members E2, E3 of the outer casings OC2, OC3 are mounted to protrude from the inner surface of the end walls 413a, 413b, as shown in FIG. 2. In the present embodiment, as shown in FIG. 2, the distance in the sliding direction D1 between the tip end of the terminal members E2, E3 and the end portion on the other side of the detachment preventing portion P in the sliding direction D1 is shorter than the length of the slider 42 in the sliding direction D1. In this case, it is suppressed that the slider 42 detaches from the non-formed region.

In the present embodiment, as shown in FIG. 2, the fixing portion 43 is provided to the side wall 411b. In this way, a portion of the side wall 411b of the housing 41 is fixed to the mounting object, and the coupling device 4 is fixed to a predetermined position of the mounting object. It should be noted that the fixing portion 43 can be provided in another part such as the other side wall 411a, the bottom wall 412, the end walls 413a, 413b, and the like.

The bottom wall 412 is a wall extending in the sliding direction D1 and the width direction D2. In the present embodiment, the bottom wall 412 connects the one pair of side walls 411a, 411b in the width direction D2 and connects the one pair of end walls 413a, 413b in the sliding direction D3. The bottom wall 412 opposes one surface (below, also called the bottom surface) of the slider 42 in the thickness direction D3. The bottom wall 412 has a sliding surface on which the bottom surface of the slider 42 slides. In the present embodiment, the bottom wall 412 has a recess portion extending in the sliding direction D1 to decrease the area of contact with the slider 42 and reduce the sliding resistance.

The top wall not shown is a wall provided in a manner opposing the bottom wall 412. The top wall serves as a lid for the housing 41 and is configured to close the housing 41 having an opening on one side when the slider 42 is housed in the housing (see FIG. 2). The top wall can be fixed, for example, by engaging with the side walls 411a, 411b or the end walls 413a, 413b, or can be connected with a hinge to the side walls 411a, 411b or the end walls 413a, 413b.

The one pair of end walls 413a, 413b are walls extending in the width direction D2 and the thickness direction D3. The one pair of end walls 413a. 413b are provided to oppose in the sliding direction D1 with each other. The one end wall 413a is configured such that the operating cable 2 is led from the exterior to the interior of the housing 41. Specifically, the one end wall 413a has a terminal fixing portion F1. A terminal member E1 of the outer casing OC1 into which the operating cable 2 is inserted is fixed to the terminal fixing portion F1 as shown in FIG. 2. The terminal fixing portion F1 can be, for example, an opening or groove passing through the end wall 413a in the sliding direction D1. The other end wall 413b is configured such that the first operated cable 31 and the second operated cable 32 are led from the exterior to the interior of the housing 41. Specifically, the other end wall 413b has terminal fixing portions F2, F3. Terminal members E2 and E3 of the outer casings OC2 and OC3 into which the first operated cable 31 and the second operated cable 32 are inserted are respectively fixed to the terminal fixing portions F2, F3, as shown in FIG. 2. The terminal fixing portions F2, F3 can be, for example, openings or grooves passing through the end wall 413b in the sliding direction D1. As described above, when the terminal members E1, E2, and E3 are fixed to the terminal fixing portions F1. F2, F3, respectively, of the end wall 413a or the end wall 413b, the terminal members E1, E2, and E3 are fixed so as to protrude in the sliding direction D1 from the inner surface of the end wall 413a or the end wall 413b.

The slider 42 is a moving member configured to slide in the housing 41. As shown in FIG. 2, the operating cable 2, the first operated cable 31 and the second operated cable 32 are connected to the slider 42. The slider 42 moves to one side (to the left in FIG. 2) in the sliding direction D1 when the operating cable 2 is operated. By the movement of the slider 42 to one side in the sliding direction D1, the first operated cable 31 and the second operated cable 32 are pull-operated to one side in the sliding direction D2. In this way, the first operated portion OP21 directly or indirectly connected to the first operated cable 31 and the second operated portion OP22 directly or indirectly connected to the second operated cable 32 are operated. While details will be described below, the slider 42 is configured to be rotatable around the axis X perpendicular to the sliding direction D1 and the width direction D2 (see FIG. 2). In this way, the slider 42 can rotate around the axis X, not only moving in the sliding direction D1. Therefore, as described below, it is possible to easily operate and synchronize the first operated cable 31 and the second operated cable 32.

As shown in FIG. 2, the slider 42 has an operating cable coupling portion 421, to which the one end 2a of the operating cable 2 is coupled such that the operating cable 2 extends to one side in the sliding direction D1, a first operated cable coupling portion 422, to which the one end 31a of the first operated cable 31 is coupled such that the first operated cable 31 extends to the other side in the sliding direction D1, and a second operated cable coupling portion 423, to which the one end 32a of the second operated cable 32 is coupled such that the second operated cable 32 extends to the other side in the sliding direction D1. Here, the term "one side in the sliding direction D1" refers to a direction in which the slider 42 moves (the direction to the left in FIGS. 2 to 4) when the operating cable 2 is pull-operated toward the operating portion OP1, of the sliding directions D1 of the slider 42 in the housing 41. Moreover, the term "the other side in the sliding direction D1" refers to a direction opposite to the one side in the sliding direction D1, of the sliding directions D1 of the slider 42 in the housing 41. Specifically, it is a direction in which the slider 42 moves (the direction to the right in FIGS. 2 to 4) when a pull operation on the operating cable 2 by the operating portion OP1 is released and, for example, the first operated cable 31 and the second operated cable 32 are pull-operated by a biasing member (such as a spring) provided to the first operated portion OP21 and the second operated portion OP22 to return to the state shown in FIG. 2 or 3 from the state shown in FIG. 4.

The overall shape of the slider 42 is not limited as long as the slider 42 can move in the sliding direction D1 and rotate around the axis X. In the present embodiment, as shown in FIG. 2, the slider 42 has a front surface 424 to be the end surface on one side in the sliding direction D1, a rear surface 425 to be the end surface on the other side in the sliding direction D1, a bottom surface opposing the bottom wall 412 of the housing 41, a top surface 426 to be the surface opposite to the bottom surface of the slider 42, and the side surfaces 427, 428 (the side edges in the width direction D2) opposing the one pair of guide surfaces G1, G2 of the housing 41 and connecting the front surface 424 and the rear surface 425 in the sliding direction D1. In the present embodiment, the front surface 424 and the rear surface 425 of the slider 42 are formed with a flat surface perpendicular to the sliding direction D1. The bottom surface and the top surface 426 are formed with a flat surface parallel to the bottom wall 412 and the top wall of the housing 41. Furthermore, as described below, the side surface 427 and the side surface 428 are formed as curved surfaces.

In the present embodiment, as shown in FIG. 2, the slider 42 is configured that the length in the sliding direction D1 is shorter than the length in the width direction D2. The slider 42 has a structure being elongated in the width direction D2 and short in the sliding direction D1. Therefore, it is possible to increase the stroke of the slider 42 in the sliding direction D1 (the length movable in the left-right direction in FIG. 2) in the housing 41, which has a limited space in the sliding direction D1, compared to that of a slider having the structure being long in the sliding direction D1 (for example, a slider having the length in the sliding direction D1 being longer than the length in the width direction D2). In the present embodiment, the length of the slider 42 in the sliding direction D1 refers to the distance in the sliding direction D1 from the front surface 424 to the rear surface 425 of the slider 42 in the initial state shown in FIG. 2, in which no force is applied on the slider 42 by the operating cable 2 (the state before the slider 42 rotates). Moreover, in the present embodiment, the length of the slider 42 in the width direction D2 refers to the distance in the width direction D2 from the outermost portion of the side surface 427 in the width direction D2 to the outermost portion of the side surface 428 in the initial state shown in FIG. 2, in which no force is applied to the slider 42 by the operating cable 2 (the state before the slider 42 rotates).

The operating cable coupling portion 421 of the slider 42 is a part to which the one end (the cable end) 2a of the operating cable 2 is coupled. When the operating cable 2 is operated to one side in the sliding direction D1, the operating cable coupling portion 421 engages with the one end 2a of the operating cable 2 in the sliding direction D1 to transmit the operating force applied on the operating cable 2 to the slider 42. Therefore, it is possible to move the slider 42 to one side in the sliding direction D1.

The shape and structure of the operating cable coupling portion 421 are not limited as long as the slider 42 can move in the sliding direction D1 and rotate around the axis X when the operating cable 2 is operated. In the present embodiment, the operating cable coupling portion 421 is configured such that the one end 2a of the operating cable 2 can rotate relative to the operating cable coupling portion 421 (the slider 42 can rotate relative to the one end 2a of the operating cable 2) when the slider 42 rotates around the axis X. In this case, as described below, when the slider 42 rotates around the axis X, it is suppressed that the one end 2a of the operating cable 2 rotates in the same direction as the slider 42 to occur bending deformation on the cable body 2b in the vicinity of the one end 2a of the operating cable 2. Therefore, it is suppressed that the cable body 2b is damaged due to repeated bending deformation of the cable body 2b. In the present embodiment, as shown in FIG. 2, a surface of the operating cable coupling portion 421, which surface opposes the cable end 2a of the operating cable 2 in contact with the cable end 2a when the operating cable 2 is pull-operated, is curved. More specifically, the operating cable coupling portion 421 has an arced surface opposing the cable end 2a of the operating cable 2 having an arced surface. However, as long as the operating cable coupling portion 421 is configured to allow the slider 42 to move in the sliding direction D1 and rotate around the axis X when the operating cable 2 is operated, the operating cable coupling portion can be formed as a curved surface other than the arced surface, or in a polygonal shape.

In the present embodiment, as shown in FIGS. 2 and 6, the operating cable coupling portion 421 has an operating cable housing recess portion 421a in which the one end 2a of the operating cable 2 is housed and an operating cable lead-out port 421b, from which the operating cable 2 is led out to one side in the sliding direction D1 from the operating cable housing recess portion 421a.

Figure 7A:
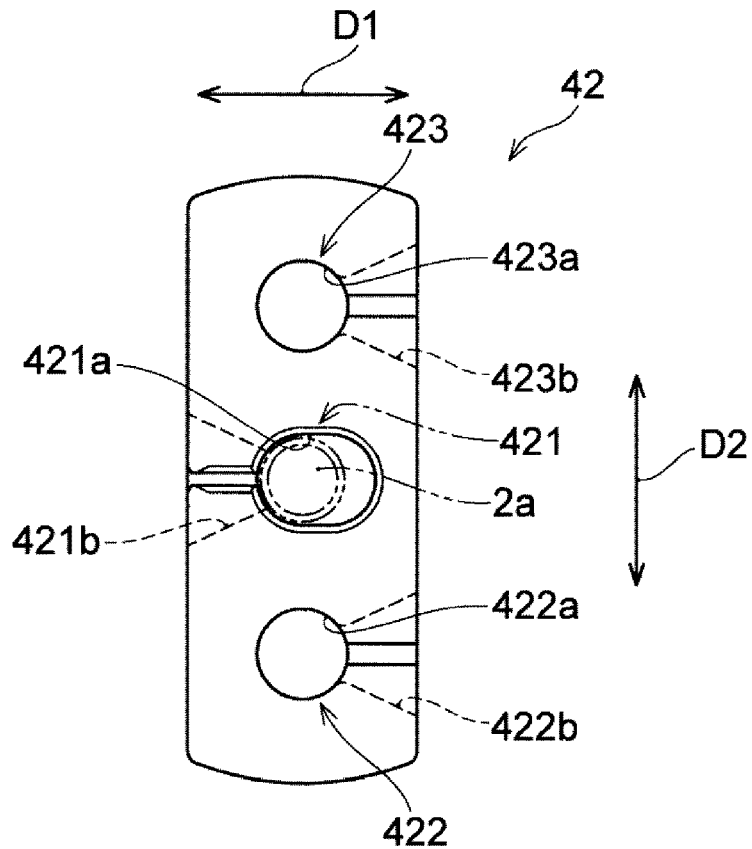
FIG. 7A is view showing a variation of the slider.
Figure 7B:
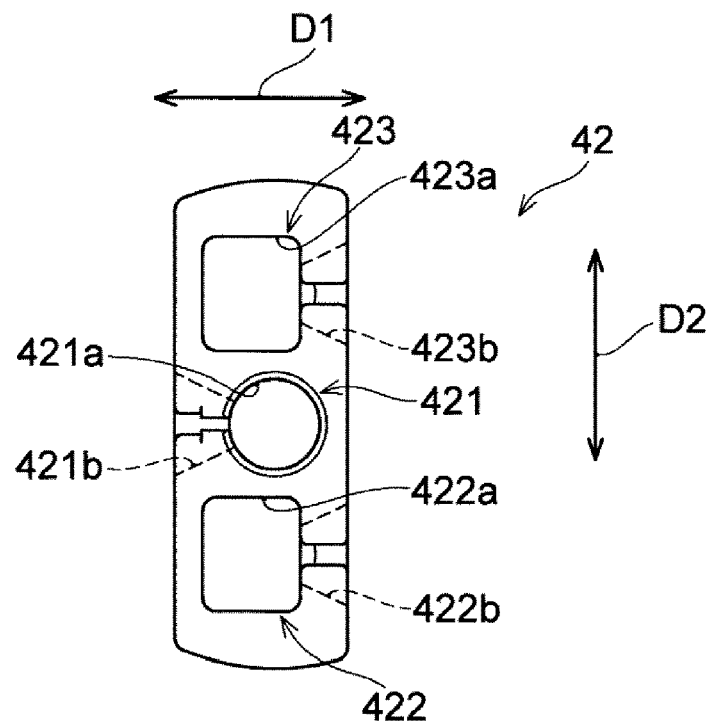
FIG. 7B is view showing a variation of the slider.

The operating cable housing recess portion 421a is a portion in which the one end (the cable end) 2a of the operating cable 2 is arranged and which engages with the one end 2a of the operating cable 2 in the sliding direction D1. The shape and structure of the operating cable housing recess portion 421a are not limited. To facilitate mounting of the one end 2a of the operating cable 2 on the slider 42, as shown in FIG. 2, and in FIG. 7A being a variation, the operating cable housing recess portion 421a is formed in an elongated manner in the sliding direction D1 such that the operating cable housing recess portion 421a has the length longer than the length of the one end 2a of the operating cable 2 in the sliding direction D1. As shown in FIG. 7B being another variation, the operating cable housing recess portion 421a can have substantially the same length in the sliding direction D1 as that of the one end of the operating cable (for example, in FIG. 7B, a spherically-shaped cable end is housed in the operating cable housing recess portion 421a). The operating cable housing recess portion 421a may have a circular shape, an elliptical shape, an oval shape, or a shape having a part of these shapes, for example, when viewed in the thickness direction D3. At least one (preferably both) of the one end 2a of the operating cable 2, and the operating cable housing recess portion 421a can be configured such that the one end 2a of the operating cable 2 can rotate relative to the operating cable housing recess portion 421a when the slider 42 rotates around the axis X. In the present embodiment, both the one end 2a of the operating cable 2, and the operating cable housing recess portion 421a have arced surfaces in the portions opposing with each other in the sliding direction D1. It should be noted that in a case that the one end 2a of the operating cable 2 is formed in a spherical shape, for example, the operating cable housing recess portion 421a can have a quadrilateral shape when viewed in the thickness direction D3. Moreover, in a case that, for example, the operating cable housing recess portion 421a has a surface having an arc such as a circle, for example, the one end 2a of the operating cable 2 can have a polygonal columnar shape.

The operating cable lead-out port 421b is a part from which the operating cable 2 is led out to the exterior of the slider 42 from the operating cable housing recess portion 421a. In the present embodiment, as shown in FIGS. 2 to 4, and 6, the operating cable lead-out port 421b extends with a predetermined width in the width direction D2 so as to suppress interference between the slider 42 and the operating cable 2 when the slider 42 rotates. In this case, as shown in FIGS. 3, 4, and 6, it is suppressed that a part in the vicinity of the one end 2a of the operating cable 2 (the cable body 2b) comes into contact with the slider 42 (the inner surface of the operating cable lead-out port 421b) to be folded when the slider 42 rotates around the axis X. Therefore, it is possible to suppress the breakage of the operating cable 2.

Specifically, in the present embodiment, as shown in FIGS. 2 to 4, and 6, the operating cable lead-out port 421b has an inner cavity configured such that the width of the opening in the width direction D2 becomes greater toward one side in the sliding direction D1 between the opening end on the other side in the sliding direction D1, which is the operating cable housing recess portion 421a side, and the opening end on one side in the sliding direction D1 of the slider 42 (the opening in the front surface 424). More specifically, the inner cavity of the operating cable lead-out port 421b is formed in a fan shape with the width of the opening in the width direction D2 gradually increasing toward one side in the sliding direction D1. In the present embodiment, a slit SL is provided on one surface of the slider 42 in the thickness direction D3 (the top surface 426 in the present embodiment). The slit SL leads to the inner cavity of the operating cable lead-out port 421b and has a width being slightly greater than the radial width of the cable body 2b. The cable body 2b is led into the operating cable lead-out port 421b via this slit SL when the operating cable 2 is mounted on the slider 42 in the thickness direction D3.

The first operated cable coupling portion 422 of the slider 42 is a part to which the one end (the cable end) 31a of the first operated cable 31 is coupled. When the operating cable 2 is operated to one side in the sliding direction D1 and the slider 42 moves to one side in the sliding direction D1, the first operated cable coupling portion 422 engages with the one end 31a of the first operated cable 31 in the sliding direction D1 to transmit, to the first operated cable 31 via the slider 42, the operating force on the operating cable 2, which is applied to the slider 42.

The shape and structure of the first operated cable coupling portion 422 is not limited as long as the first operated cable coupling portion 422 can transmit, to the first operated cable 31 via the slider 42, the operating force on the operating cable 2, which is applied to the slider 42, and rotation of the slider 42 around the axis X is not hindered. In the present embodiment, the first operated cable coupling portion 422 is configured such that the one end 31a of the first operated cable 31 can rotate relative to the first operated cable coupling portion 422 (the slider 42 can rotate relative to the one end 31a of the first operated cable 31) when the slider 42 rotates around the axis X. In this case, as described below, when the slider 42 rotates around the axis X, it is suppressed that the one end 31a of the first operated cable 31 rotates in the same direction as the slider 42 to occur bending deformation on the cable body 31b in the vicinity of the one end 31a of the first operated cable 31.

In the present embodiment, as shown in FIGS. 2 and 5, the first operated cable coupling portion 422 has a first operated cable housing recess portion 422a in which the one end 31a of the first operated cable 31 is housed, and a first operated cable lead-out port operated cable 422b, from which the first operated cable 31 is led out to the other side in the sliding direction D1 from the first operated cable housing recess portion 422a.

The first operated cable housing recess portion 422a is a portion in which the one end (the cable end) 31a of the first operated cable 31 is arranged and which engages with the one end 31a of the first operated cable 31 in the sliding direction D1. The shape and structure of the first operated cable housing recess portion 422a are not limited. In the present embodiment, as shown in FIG. 2, the length of the first operated cable housing recess portion 422a in the sliding direction D1 is substantially same as the length of the one end 31a of the first operated cable 31 in the sliding direction D1 (being slightly greater than the length of the one end 31a of the first operated cable 31 in the sliding direction D1). However, to facilitate mounting of the one end 31a of the first operated cable 31 on the slider 42, the first operated cable housing recess portion 422a can be formed in an elongated manner in the sliding direction D1 such that the length of the first operated cable housing recess portion 422a in the sliding direction D1 is greater than the length of the one end 31a of the first operated cable 31 in the sliding direction D1. In the present embodiment, as shown in FIGS. 2 to 4, the first operated cable housing recess portion 422a is formed in a rectangular shape when viewed in the thickness direction D3, but as shown in FIG. 7A being a variation, the first operated cable housing recess portion 422a can be formed in another shape such as a circular shape, for example.

At least one (preferably both) of the one end 31a of the first operated cable 31, and the first operated cable housing recess portion 422a can be configured such that the one end 31a of the first operated cable 31 can rotate relative to the first operated cable housing recess portion 422a when the slider 42 rotates around the axis X. In the present embodiment, the one end 31a of the first operated cable 31 has an arced surface in a part engaging with the first operated cable housing recess portion 422a in the sliding direction D1 and the first operated cable housing recess portion 422a is formed in a rectangular shape when viewed in the thickness direction D3. However, as shown in FIG. 7A being a variation, both the one end 31a of the first operated cable 31, and the first operated cable housing recess portion 422a can be configured to have arced surfaces in the portions opposing with each other in the sliding direction D1. Moreover, in a case that, for example, the first operated cable housing recess portion 422a has a surface having an arc such as a circle, for example, the one end 31a of the first operated cable 31 can have a polygonal columnar shape.

The first operated cable lead-out port 422b is a part which the first operated cable 31 is led out to the exterior of the slider 42 from the first operated cable housing recess portion 422a. In the present embodiment, as shown in FIGS. 2 to 5, the first operated cable lead-out port 422b extends with a predetermined width in the width direction D2 so as to suppress interference between the slider 42 and the first operated cable 31 when the slider 42 rotates. In this case, as shown in FIGS. 3 to 5, it is suppressed that a part in the vicinity of the one end 31a of the first operated cable 31 (the cable body 31b) comes into contact with the slider 42 (the inner surface of the first operated cable lead-out port 422b) to be folded when the slider 42 rotates around the axis X. Therefore, it is possible to suppress the breakage of the first operated cable 31.

Specifically, in the present embodiment, as shown in FIGS. 2 to 5, the first operated cable lead-out port 422b has an inner cavity configured such that the width of the opening in the width direction D2 becomes greater toward the other side in the sliding direction D1 between the opening end on one side in the sliding direction D1, which is the first operated cable housing recess portion 422a side, and the opening end on the other side in the sliding direction D1 of the slider 42 (the opening in the rear surface 425). More specifically, the inner cavity of the first operated cable lead-out port 422b is formed in a fan shape with the width of the opening in the width direction D2 gradually increasing toward the other side in the sliding direction D1. In the present embodiment, a slit SL is formed on one surface of the slider 42 in the thickness direction D3 (the top surface 426 in the present embodiment). The slit L leads to the inner cavity of the first operated cable lead-out port 422b and has a width being slightly greater than the radial width of the cable body 31b. The cable body 31b is introduced into the first operated cable lead-out port 422b via this slit SL when the first operated cable 31 is mounted on the slider 42 in the thickness direction D3.

The second operated cable coupling portion 423 has basically the same structure as that of the first operated cable coupling portion 422, so that detailed explanations thereof will be omitted. Matters explained with respect to the first operated cable coupling portion 422 can similarly be applied to the second operated cable coupling portion 423. In the present embodiment, the first operated cable coupling portion 422 and the second operated cable coupling portion 423 have the same features except for the portion provided, but the first operated cable coupling portion 422 and the second operated cable coupling portion 423 can have different shapes and structures with each other.

The second operated cable coupling portion 423 is a part to which the one end (the cable end) 32a of the second operated cable 32 is coupled. When the operating cable 2 is operated to one side in the sliding direction D1 and the slider 42 moves to one side in the sliding direction D1, the second operated cable coupling portion 423 engages with the one end 32a of the second operated cable 32 in the sliding direction D1 to transmit, to the second operated cable 32 via the slider 42, the operating force on the operating cable 2, which is applied to the slider 42.

In the present embodiment, as shown in FIGS. 2 and 5, in the same manner as the first operated cable coupling portion 422, the second operated cable coupling portion 423 has a second operated cable housing recess portion 423a, and a second operated cable lead-out port 423b. The second operated cable housing recess portion 423a houses the one end 32a of the second operated cable 32. The second operated cable lead-out port 423b leads out the second operated cable 32 toward the other side in the sliding direction D1 from the second operated cable housing recess portion 423a. Moreover, as shown in FIGS. 2 to 5, the second operated cable lead-out port 423b extends with a predetermined width in the width direction D2 so as to suppress interference between the slider 42 and the second operated cable 32 when the slider 42 rotates.

As shown in FIG. 2, the first operated cable coupling portion 422 is provided on one side in the width direction D2 with respect to the operating cable coupling portion 421, and the second operated cable coupling portion 423 is provided on the other side in the width direction D2 with respect to the operating cable coupling portion 421. In other words, the position of the operating cable coupling portion 421 in the width direction D2 is between the position of the first operated cable coupling portion 422 in the width direction D2 and the position of the second operated cable coupling portion 423 in the width direction D2. Here, the term "the first operated cable coupling portion 422 is provided on one side in the width direction D2 with respect to the operating cable coupling portion 421" refers to the first operated cable coupling portion 422 (the one end 31a of the first operated cable 31 engaging with the first operated cable coupling portion 422) being arranged on one side (at the position close to the guide surface G1) of the operating cable coupling portion 421 (the one end 2a of the operating cable 2 engaging with the operating cable coupling portion 421) in the slider 42 in the width direction D2 regardless of the position in the sliding direction D1 and the thickness direction D3. Moreover, the term "the second operated cable coupling portion 423 is provided on the other side in the width direction D2 with respect to the operating cable coupling portion 421" refers to the second operated cable coupling portion 423 (the one end 32a of the second operated cable 32 engaging with the second operated cable coupling portion 423) being arranged on the other side (at the position close to the guide surface G2) of the operating cable coupling portion 421 (the one end 2a of the operating cable 2 engaging with the operating cable coupling portion 421) in the slider 42 in the width direction D2 regardless of the position in the sliding direction D1 and the thickness direction D3. The positions of the first operated cable coupling portion 422 (the one end 31a of the first operated cable 31 engaging with the first operated cable coupling portion 422) and the second operated cable coupling portion 423 (the one end 32a of the second operated cable 32 engaging with the second operated cable coupling portion 423) in the sliding direction D1 and the thickness direction D3 with respect to the operating cable coupling portion 421 (the one end 2a of the operating cable 2 engaging with the operating cable coupling portion 421) are not limited as long as the slider 42 can move in the sliding direction D1 and can rotate around the axis X. For example, with respect to the operating cable coupling portion 421, the first operated cable coupling portion 422 and the second operated cable coupling portion 423 can be provided in an arrangement being offset in the sliding direction D1, or can be provided at a position being offset in the thickness direction.

In the present embodiment, as shown in FIG. 2, the operating cable coupling portion 421, the first operated cable coupling portion 422, and the second operated cable coupling portion 423 are configured such that the one end 2a of the operating cable 2, the one end 31a of the first operated cable 31, and the one end 32a of the second operated cable 32 that are coupled to the slider 42 are arranged side by side in the width direction D2. Here, the term "arranged side by side in the width direction D2" refers to the state in which a part of the one end 2a of the operating cable 2, a part of the one end 31a of the first operated cable 31, and a part of the one end 32a of the second operated cable 32 that are coupled to the operating cable coupling portion 421, the first operated cable coupling portion 422, and the second operated cable coupling portion 423, respectively, are provided side by side in the width direction D2 so as to overlap for a predetermined length in the sliding direction D1. In this case, the slider 42 can be compactly configured in the sliding direction D1 compared to a case in which, for example, the first operated cable coupling portion and the second operated cable coupling portion are arranged in an offset manner so as to not overlap the operating cable coupling portion in the sliding direction D1.

In the present embodiment, as described above, the slider 42 is configured to be rotatable around the axis X perpendicular to the sliding direction D1 and the width direction D2. In this way, even in a case that the first operated cable 31 and the second operated cable 32 are routed in different lengths with each other and/or in different routing paths with each other, it is possible to easily operate the two operated cables 31, 32 so as to synchronize the two operated cables 31, 32 when the operating cable 2 is operated in one direction in the sliding direction D1. Specifically, since the slider 42 is configured to rotate around the axis X, the slider 42 rotates (or slides and rotates) until the allowance is no longer present in either of the operated cables in a case that the amount of the allowance that occurs in the first operated cable 31 (the amount of the allowance removed until a force is transmitted to the operation target (the first operated portion OP21) by the first operated cable 31) and the amount of the allowance that occurs in the second operated cable 32 (the amount of the allowance removed until a force is transmitted to the operation target (the second operated portion OP22) by the second operated cable 32) are different when the operating cable 2 is pull-operated as shown in FIGS. 2 and 3. In this way, even in a case that the two operated cables 31, 32 have different amounts of the allowance with each other due to the two operated cables 31, 32 being routed in different lengths with each other and/or in different routing paths with each other, the slider 42 slides in the sliding direction D1 with the allowance of both of the operated cables 31, 32 being removed by the slider 42 rotating. Therefore, it is possible to easily operate the first operated cable 31 and the second operated cable 32 so as to synchronize the first operated cable 31 and the second operated cable 32. In this way, the operation target operated by the first operated cable 31 (the first operated portion OP21) and the operation target operated by the second operated cable 32 (the second operated portion OP22) can be operated substantially simultaneously by the first operated cable 31 and the second operated cable 32.

The axis X is the rotational axis of the slider 42, and the position of the axis X is not limited as long as the axis X is an axis perpendicular in the sliding direction D1 and the width direction D2 (an axis extending in the thickness direction D3). In the present embodiment, the axis X is configured to be positioned at the position of the cable end 2a of the operating cable 2 coupled to the operating cable coupling portion 421 and the slider 42 is configured to rotate around the cable end 2a of the operating cable 2. However, for example, the slider 42 may be configured to rotate around an axial member (an axial member extending in the thickness direction D3 and this axial member is to be the axis X), which is separately provided to the slider 42 and is guided in the sliding direction D1 with respect to the housing 41. In this case, the above-mentioned axial member can be guided in the sliding direction D1 by a guide groove and the like extending in the sliding direction D1 on the bottom wall 412 of the housing 41, for example. Moreover, the one end 2a of the operating cable 2 can be arranged in a manner offset with respect to the axis X in the sliding direction D1 or the width direction D2.

In the present embodiment, as shown in FIG. 2, the axis X is configured such that it is positioned at the one end 2a of the operating cable 2 coupled to the operating cable coupling portion 421 and the slider 42 rotates around the one end 2a of the operating cable 2. In this case, since the center of rotation of the slider 42 is the one end 2a (axis X) of the operating cable 2, even when a force is applied to the slider 42 in the sliding direction D1 when the operating cable 2 is pull-operated, the rotation of the slider 42 is difficult to be hindered by the above-mentioned force applied in the above-mentioned sliding direction D1. Therefore, the rotational movement of the slider 42 can be made smooth. More specifically, the cable end 2a of the operating cable 2 has a spherical shape, or a cylindrical shape extending in the thickness direction D3, and the center of the circle of the cable end 2a when viewed in the thickness direction D3 constitutes the axis X. Moreover, a portion opposing the cable end 2a in the operating cable housing recess portion 421a has an arced surface having a curvature corresponding to the curvature of the arced surface of the cable end 2a. In this case, the slider 42 rotates more smoothly relative to the cable end 2a around the axis X which is the center of the cable end 2a.

Moreover, in the present embodiment, both side edges (the side surfaces 427, 428) in the width direction D2 of the slider 42 have curved surfaces C1, C2 to be convex toward each of the one pair of guide surfaces G1, G2 such that movement of the slider 42 in the sliding direction D1 is not hindered when the slider 42 rotates around the axis X as shown in FIGS. 2 to 4. Here, the term "such that movement of the slider 42 in the sliding direction D1 is not hindered when the slider 42 rotates around the axis X" means that the rotation of the slider 42 to remove the allowance of the first operated cable 31 and the second operated cable 32 is not hindered, and the slider 42 continues to move in the sliding direction D1 without the both side edges of the slider 42 in the width direction D2 being caught to the guide surfaces G1, G2 when the slider 42 rotates. In the present embodiment, the curved surfaces C1, C2 are preferably curved before and after the rotation of the slider 42 around the axis X such that the distance from one end to the other end in the width direction D2 is less than or equal to the distance to the one pair of guide surfaces G1, G2. The shape and curvature of the curved surfaces C1, C2 are not limited as long as the curved surfaces C1, C2 are curved such that movement of the slider 42 in the sliding direction D1 is not hindered when the slider 42 rotates around the axis X. The curved surfaces C1, C2 can be arced surfaces as described below, can be a part of an elliptic arc, or can vary in curvature along a direction in which the curved surfaces C1, C2 extend.

The both side edges of the slider 42 in the width direction D2 being provided with the curved surfaces C1, C2 makes it easy to maintain the state in which the curved surfaces C1, C2 of the slider 42 are guided with respect to the one pair of guide surfaces G1, G2 even when the slider 42 rotates around the axis X to remove the allowance of the first operated cable 31 and the second operated cable 32. Therefore, the slider 42 can move in the sliding direction D1 stably even after the slider 42 rotates.

In the present embodiment, the curved surfaces C1, C2 are formed with arced surfaces centered on the axis X to be the center of rotation of the slider 42. In this case, the distance from one end to the other end of the slider 42 in the width direction D2 is constant even when the slider 42 rotates. Therefore, regardless of the angle of rotation of the slider 42, the relative position between the curved surfaces C1, C2 of the slider 42 and the guide surfaces G1, G2 of the housing 41 is unlikely to change. Therefore, regardless of whether the angle of rotation of the slider 42 is large or small, guiding of the curved surfaces C1, C2 of the slider 42 with respect to the guide surfaces G1, G2 can be maintained in the same manner to stably move the slider 42 in the sliding direction D1.

The curved surfaces C1, C2 formed as arced surfaces are configured such that the radius to the curved surfaces C1, C2 from the axis X to be the center of rotation of the slider 42 is constant. This ensures that the distance from one end to the other end in the width direction D2 does not vary before and after the rotation of the slider 42. The separation distance of the guide surfaces G1, G2 in the width direction D2 is set to be the corresponding distance to the diameter of the curved surfaces C1, C2 being an arc around the axis X. The term "corresponding distance" means that the diameter of the curved surfaces C1, C2 being an arc and the separation distance between the guide surfaces G1, G2 are approximately the same or there is a slight clearance between the curved surfaces C1, C2 and the guide surfaces G1, G2 to secure the smoothness of mounting or sliding of the slider 42. The numerical values of the above-mentioned clearance are obvious for a person skilled in the art and can be changed as needed by a person skilled in the art, so that they are not limited.

Next, using an example in which the cable coupling mechanism 1 of the present embodiment is applied to the cable operating mechanism M for unlocking the hood H of the vehicle V, operation and effects of the cable coupling mechanism 1 will be described. It should be noted that the explanation below is merely one example, so that the cable coupling mechanism of the present invention is not to be limited by the explanation below.

As shown in FIG. 1, the cable operating mechanism M comprises the operating portion OP1 (hood opener) provided at the driver's compartment of the vehicle V, the operating cable 2 connected to the operating portion OP1, the coupling device 4, the first operated cable 31, the second operated cable 32, the first operated portion OP21 connected to the first operated cable 31, and the second operated portion OP22 connected to the second operated cable 32. The first operated portion OP21 and the second operated portion OP22 are locking members to lock the hood H to a vehicle body. The first operated portion OP21 and the second operated portion OP22 are operated by a pull operation of the first operated cable 31 and the second operated cable 32 via the slider 42 of the coupling device 4 by a pull operation of the operating cable 2 when the operating portion OP1 is operated. When locking between the first operated portion OP21 and the second operated portion OP22 being locking members and a locked member being the hood H is released, the hood H can be opened with respect to the vehicle body. In a case that the first operated portion OP21 and the second operated portion OP22 are separately provided at two locations of the mounting object (vehicle V) in this way, as shown in FIG. 1, the length of the first operated cable 31 and the length of the second operated cable 32 differ from each other and the routing paths thereof also differ. In such a case, the amount of the allowance in the outer casing OC2 of the longer second operated cable 32 is greater than the amount of the allowance in the outer casing OC3 of the shorter first operated cable 31. Therefore, in the absence of the cable coupling mechanism 1 of the present embodiment, when the ends (the one ends 31a, 32a) of the first operated cable 31 and the second operated cable 32 on the coupling device 4 side are pulled simultaneously, the allowance of the first operated cable 31 and the allowance of the second operated cable 32 are not removed simultaneously. The first operated portion OP21 is operated by the shorter first operated cable 31 and thereafter, with a delay, the second operated portion OP22 is operated by the second operated cable 32. In this way, in a case that the first operated cable 31 and the second operated cable 32 are not operated synchronously, when the first operated portion OP21 is operated up to the operation limit and the first operated portion OP21 cannot move any further (the slider and the first operated cable 31 cannot move), for example, the second operated portion OP22 and the second operated cable 32 being in the middle of operation also cannot be operated any further. In that case, the second operated portion OP22 cannot be unlocked, or an excessive force applied on the first operated portion OP21 or the second operated portion OP22 being a locking member can cause breakage of the member.

In the present embodiment, since the slider 42 provided to the coupling device 4 is rotatable around the axis X, the first operated cable 31 and the second operated cable 32 can be operated synchronously with the above-described allowance of the first operated cable 31 and the second operated cable 32 being removed. Below, this point will be explained in detail.

FIG. 2 shows the state of the slider 42 before the operating cable 2 is operated. Starting from the above-mentioned state, when the operating portion OP1 is operated and the operating cable 2 is pull-operated, the slider 42 is subjected to a force on one side (to the left in FIG. 2) in the sliding direction D1 by the operating cable 2. Until both the allowance of the first operated cable 31 and the allowance of the second operated cable 32 are removed in approximately the same amounts, the slider 42 moves to one side in the sliding direction D1 with almost no rotation. In case that the allowance of the shorter first operated cable 31 is removed and the allowance of the longer second operated cable 32 remains, when the operating cable 2 is further pull-operated to one side in the sliding direction D1, the slider 42 rotates around the axis X as shown in FIG. 3. At this time, the first operated cable 31, the allowance of which is removed, can transmit a force to the first operated portion OP21 and the first operated cable 31 is under tension. On the other hand, the allowance of the second operated cable 32 still remains. Therefore, when a force is applied by the operating cable 2 to the slider 42 on one side in the sliding direction D1 and the cable end 2a of the operating cable 2 slightly moves to one side (to the left in FIGS. 2 and 3) in the sliding direction D1, the cable end 31a of the first operated cable 31 almost does not move to one side in the sliding direction D1. On the other hand, because the allowance of the second operated cable 32 is present, the cable end 32a of the second operated cable 32 moves to one side in the sliding direction D1 by the slider 42 rotating around the axis X. In this way, since the slider 42 rotates around the axis X and the cable end 32a of the second operated cable 32 moves relative to the cable end 31a of the first operated cable 31 in the sliding direction D1 as shown in FIG. 3, the allowance of the second operated cable 32 is removed. Therefore, the allowance of the first operated cable 31 and the allowance of the second operated cable 32 are both removed before the operated portion OP21 and the second operated portion OP22 are operated.

As shown in FIG. 3, the slider 42 has the operating cable lead-out port 421b, the first operated cable lead-out port 422b, and the second operated cable lead-out port 423b that extend with a predetermined width in the width direction D2. In this way, when the slider 42 rotates around the axis X, it is suppressed that a part in the vicinity of the cable end 2a of the operating cable 2, a part in the vicinity of the cable end 31a of the first operated cable 31, and a part in the vicinity of the cable end 32a of the second operated cable 32 come into contact with a part of the slider 42 and are folded. Therefore, the operating cable 2, the first operated cable 31, and the second operated cable 32 are maintained linearly along the sliding direction D1 in the housing 41 before and after the rotation of the slider 42, and the breakage of the operating cable 2, the first operated cable 31, and the second operated cable 32 is suppressed.

After the slider 42 rotates by a predetermined angle corresponding to the difference in the amounts of the allowance of the first operated cable 31 and the allowance of the second operated cable 32 as shown in FIG. 3, the operating cable 2 is further pull-operated to one side in the sliding direction D1. As shown in FIG. 4, the slider 42 moves in parallel in the sliding direction D1 while maintaining the angle of rotation with the allowance of the first operated cable 31 and the allowance of the second operated cable 32 being removed as shown in FIG. 3. In this way, the first operated cable 31 and the second operated cable 32 are simultaneously pull-operated to one side in the sliding direction D1 by the slider 42 with the allowance of the first operated cable 31 and the second operated cable 32 being removed. Therefore, the first operated portion OP21 connected to the first operated cable 31 and the second operated portion OP22 connected to the second operated cable 32 are operated with the same amount of operation at the same timing. Thus, unlocking operations on the first operated portion OP21 and on the second operated portion OP22 are surely carried out and also the application of an excessive force on each member is suppressed. Moreover, even in a case that the elastic elongation occurs with respect to the first operated cable 31 and/or the second operated cable 32 after the allowance of the first operated cable 31 and the allowance of the second operated cable 32 are removed, the elastic elongation can be removed by the slider 42 making a sliding movement as described above, and rotating in accordance with the amount of elastic elongation of the respective operated cables.

Moreover, since the curved surfaces C1 and C2 provided at the both side edges of the slider 42 in the width direction D2 are formed as arced surfaces around the axis X, the slider 42 can maintain a predetermined state of contact with or a predetermined distance with the guide surfaces G1, G2 before and after the rotation. Therefore, the slider 42 can smoothly slide in the sliding direction D1 without significant rattling in the housing 41.

REFERENCE SIGNS LIST

1 Cable coupling mechanism
2 Operating cable

21

2a One end (cable end) of operating cable
2b Cable body
31 First operated cable
31a One end (cable end) of first operated cable
31b Cable body
32 Second operated cable
32a One end (cable end) of second operated cable
32b Cable body
4 Coupling device
41 Housing
411a, 411b Side wall
412 Bottom wall
413a, 413b End wall
42 Slider
421 Operating cable coupling portion
421a Operating cable housing recess portion
421b Operating cable lead-out port
422 First operated cable coupling portion
422a First operated cable housing recess portion
422b First operated cable lead-out port
423 Second operated cable coupling portion
423a Second operated cable housing recess portion
423b Second operated cable lead-put port
424 Front surface
425 Rear surface
426 Top surface
427, 428 Side surface
43 Fixing portion
C1, C2 Curved surface
D1 Sliding direction
D2 Width direction
D3 Thickness direction
E1, E2, E3 Terminal member of outer casing
F1, F2, F3 Terminal fixing portion
G1, G2 Guide surface
H Hood
M Cable operating mechanism
OC1, OC2, OC3 Outer casing
OP1 Operating portion
OP21 First operated portion
OP22 Second operated portion
P Detachment preventing portion
SL Slit
V Vehicle
X Axis

The invention claimed is:

1. A cable coupling mechanism, comprising:
an operating cable directly or indirectly connected to an operating portion;
a first operated cable being operated by an operating force of the operating cable;
a second operated cable being operated by the operating force of the operating cable; and
a coupling device coupling the operating cable to the first operated cable and the second operated cable,
wherein the coupling device has a housing, and a slider to slide in the housing;
wherein the housing has one pair of guide surfaces extending along a sliding direction of the slider and opposing with each other in a width direction perpendicular to the sliding direction;
wherein the slider has
an operating cable coupling portion, to which one end of the operating cable is coupled such that the operating cable extends to one side in the sliding direction;

a first operated cable coupling portion, to which one end of the first operated cable is coupled such that the first operated cable extends to another side in the sliding direction; and
a second operated cable coupling portion, to which one end of the second operated cable is coupled such that the second operated cable extends to the other side in the sliding direction,
wherein the first operated cable coupling portion is provided on one side in the width direction with respect to the operating cable coupling portion, the second operated cable coupling portion is provided on another side in the width direction with respect to the operating cable coupling portion,
wherein the operating cable coupling portion, the first operated cable coupling portion, and the second operated cable coupling portion are configured such that a part of the one end of the operating cable, a part of the one end of the first operated cable, and a part of the one end of the second operated cable that are coupled to the slider are arranged side by side in the width direction to overlap for a predetermined length in the sliding direction,
wherein the slider is configured to be rotatable around an axis perpendicular to the sliding direction and the width direction,
wherein both side edges in the width direction of the slider have curved surfaces to be convex toward each of the one pair of guide surfaces such that movement of the slider in the sliding direction is not hindered when the slider rotates around the axis,
wherein the curved surfaces are formed with arced surfaces centered on an axis to be a center of rotation of the slider and to maintain a state in which the curved surfaces of the slider are guided with respect to the one pair of guide surfaces when the slider rotates around the axis, and
wherein the slider is configured that the length in the sliding direction is shorter than the length in the width direction.

2. The cable coupling mechanism according to claim 1, wherein the operating cable coupling portion has an operating cable housing recess portion in which the one end of the operating cable is housed and an operating cable lead-out port, from which the operating cable is led out to one side in the sliding direction from the operating cable housing recess portion,
wherein the first operated cable coupling portion has a first operated cable housing recess portion in which the one end of the first operated cable is housed, and a first operated cable lead-out port, which the first operated cable is led out to the other side in the sliding direction from the first operated cable housing recess portion,
wherein the second operated cable coupling portion has a second operated cable housing recess portion in which the one end of the second operated cable is housed, and a second operated cable lead-out port, which the second operated cable is led out to the other side in the sliding direction from the second operated cable housing recess portion, and
wherein the operating cable lead-out port, the first operated cable lead-out port, and the second operated cable lead-out port extend with a predetermined width in the width direction so as to suppress interference between the slider and the operating cable, between the slider and the first operated cable, and between the slider and the second operated cable when the slider rotates.

* * * * *